(12) United States Patent
Sato

(10) Patent No.: US 6,171,040 B1
(45) Date of Patent: Jan. 9, 2001

(54) THREAD INSERT HAVING DETACHABLE TONGUE

(75) Inventor: Takashi Sato, Kashiwazaki (JP)

(73) Assignee: Kato Spring Works Co., Ltd., Tokyo (JP)

( * ) Notice: Under 35 U.S.C. 154(b), the term of this patent shall be extended for 0 days.

(21) Appl. No.: 09/392,429

(22) Filed: Sep. 9, 1999

(30) Foreign Application Priority Data

Sep. 18, 1998 (JP) .................................................. 10-265554
Mar. 8, 1999 (JP) .................................................. 11-060911

(51) Int. Cl.[7] .................................................. F16B 37/12
(52) U.S. Cl. ........................................... 411/178; 411/438
(58) Field of Search ............................... 411/178, 16, 17, 411/18, 438

(56) References Cited

U.S. PATENT DOCUMENTS 2,371,674 * 3/1945 Caminez ........................... 411/438 X

FOREIGN PATENT DOCUMENTS 123064    1/1947  (AU) .
0 140 812 B1   3/1988  (EP) .

* cited by examiner

Primary Examiner—Neill Wilson
(74) Attorney, Agent, or Firm—Scully, Scott, Murphy & Presser

(57) ABSTRACT

The thread insert of the present invention comprises a helical body having a front end portion (3) and a back end portion (6), and a detachable tongue (4) connected to the front end portion (3) of the helical body, and a pair of engaging notches (10) are formed in the back end portion (6). A female thread (2) is formed on an inner surface of the helical body, a male thread (1) is formed on an outer surface of the helical body. The detachable tongue (4) has a circular portion (3a) having an outer diameter which is smaller than that of the helical body. A cutting notch (11) is formed between the front end portion (3) and the circular portion (3a) on at least one of a surface facing backward and a inner surface of the helical body.

10 Claims, 9 Drawing Sheets

(a)

(b)

(a)

(b)

THREAD INSERT HAVING DETACHABLE TONGUE

BACKGROUND OF THE INVENTION

1. Field of the Invention

The present invention relates to a thread insert having a detachable tongue which is screwed into a hole formed in a work for providing a female thread on the inner surface of the hole.

2. Description of Related Art

Thread inserts are helical parts used for forming a female thread on the inner surface of a hole formed in a work which is made of a material having relatively low hardness such as plastics or aluminum.

FIGS. 20–22 illustrate an example of conventional thread inserts. This thread insert is formed by winding a metal wire in a helical shape, and a male screw 31 and a female screw 32 are respectively formed on the outer and the inner surfaces of the helical wire. At the front end of the helical wire, a first coil portion 33 having a smaller diameter is formed so that the thread insert can be smoothly screwed into a hole from the side of the first coil portion 33.

A detachable tongue 34 is formed at the front end of the first coil portion 33 so as to extend toward the center of the first coil portion 33, and a notch 35 is formed on the wire by cutting between the first coil portion 33 and the tongue 34 for facilitating the detachment of the tongue 34.

When the thread insert is used, the detachable tongue 34 is grasped by a tool (not shown) inserted through the thread insert, and the thread insert is screwed into a hole of a work by the tool. Then, the detachable tongue 34 is pushed by an another tool inserted through the screwed insert, and the tongue 34 is detached by breaking the wire at the notch 35. After detaching the tongue 34, it is possible to screw a bolt into the insert beyond the length of the insert.

In order to extract the insert screwed in the work, as shown in FIG. 23, a detachment tool 37 is pushed into the back end portion 36 of the thread insert so that a pair of cutting edges 39 of the tool 37 bite in the inner thread 32 of the insert. Then, the tool 37 is rotated so as to unscrew the insert from the work.

However, the above thread insert has the following drawbacks. That is, the above thread insert cannot be extracted unless the special detachment tool 37 having cutting edges is used. Furthermore, if the pushing force of the detachment tool 37 is too weak, the tool 37 does not form notches 38 having a sufficient depth, and it is not possible to rotate the thread insert by the tool 37. In contrast, if the pushing force of the detachment tool 37 is too strong, the tool 37 enlarges the diameter of the thread insert, and the risk will arise that the inner surface of the hole will be damaged. Should the inner surface of the hole be damaged, it becomes necessary to re-tap the hole in order to attach a new thread insert in the same hole, and the new thread insert must be larger than the original one if the inner diameter of the hole is enlarged by re-tapping. Therefore, the operation of the detachment tool 37 is not easy and requires the skill of an expert.

Additionally, because the notch 35 is formed on the front surface of the wire as shown in FIG. 21, when the tongue 34 is pushed by the tool inserted through the thread insert, a crack generates from the back surface 35a opposite to the notch 35. However, the back surface 35a is smooth, stress generated by pushing the tongue 34 does not concentrate on a single point in the wire, and breaking the wire requires large load.

Furthermore, because the back end 36 of the insert is flat, when the thread insert is unscrewed, the edge 36a of the back end 36 scrapes the inner surface of the hole. The scraping by the back edge 36a not only increases the rotational resistance of the insert, but also increases the risk that the inner surface of the hole will be damaged.

SUMMARY OF THE INVENTION

It is an object of the present invention to provide a thread insert which can be easily extracted without a special tool and the skill of an expert.

In order to accomplish the above object, the thread insert comprises a helical body having a front end portion and a back end portion, and a detachable tongue connected to the front end portion of the helical body, wherein at least one engaging notch is formed in the back end portion of the helical body.

In the thread insert of the present invention, by inserting a general tool such as a minus driver (flathead screwdriver) into the engaging notch, it is possible to firmly rotate the thread insert screwed in a work, and it is possible to easily extract the thread insert without the skill of an expert. The back end portion may have a pair of the engaging notches formed at an interval of 180 on the inner surface of the back end portion.

The helical body may comprise a female thread formed on an inner surface of the helical body, and a male thread formed on an outer surface of the helical body. Furthermore, the detachable tongue may have a circular portion having an outer diameter which is smaller than that of the helical body.

It is another object of the present invention to facilitate the detachment of the detachable tongue after the insert is screwed into a work. In order to accomplish this object, at least one cutting notch may be formed between the front end portion of the helical body and the detachable tongue on at least one of a surface facing toward the back end portion and a surface facing toward a center axis of the helical body.

In this case, when the detachable tongue is pushed ahead, stress will concentrate at the bottom of the cutting notch, and a crack will generate from the bottom of the cutting notch. Therefore, it is possible to facilitate the cutting of the detachable notch. The cutting notch may have a "V" cross section, and may be formed between the front end portion of the helical body and the circular portion of the detachable tongue.

The back end portion may have a back end face chamfered at an outer side of the helical body. In this case, because the back end portion does not scrape the inner surface of the insert when the thread insert is unscrewed, it is possible to prevent the damage of the inner surface of the hole in which the thread insert was screwed. The back end surface of the back end portion additionally may have a flat face perpendicular to an outer surface of the helical body, and the whole circumferential edge of the flat face may be chamfered.

Furthermore, the engaging notch may have a tool contact surface which intersects with the inner surface of the helical body at substantially a right angle or an acute angle, and further which faces toward the clockwise direction. In this case, the rotational force applied to an unscrewing tool can be effectively transmitted to the engaging notches.

DETAILED DESCRIPTION OF THE INVENTION

Figure 1:
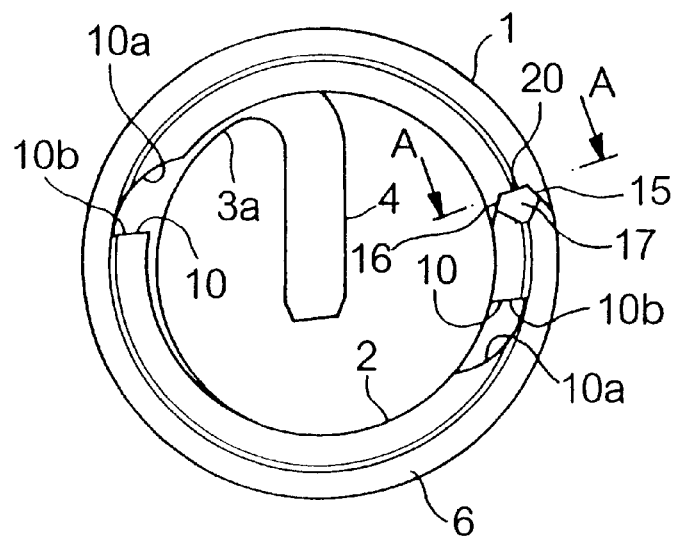
FIG. 1 is a back view of a thread insert according to the first embodiment of the present invention.
Figure 2:
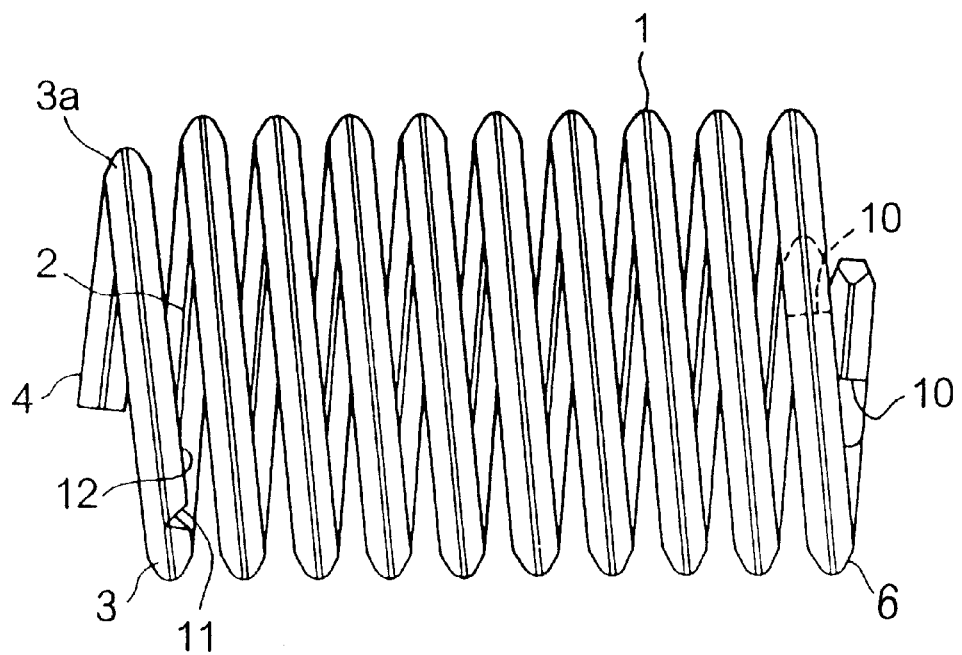
FIG. 2 is a side view of the thread insert according to the first embodiment

FIGS. 1–6 illustrate a thread insert having a detachable tongue according to the first embodiment of the present invention. This thread insert comprises a helical body having a front end portion 3 and a back end portion 6, and a detachable tongue 4 connected to the front end portion 3 of the helical body. The detachable tongue 4 is used for applying a rotational force to the thread insert when the thread insert is screwed into a work. A female thread 2 is formed on the inner surface of the helical body, and a male thread 1 is formed on the outer surface of the helical body. In this embodiment, the helical insert is manufactured by forming a metal wire into a spiral shape, and the metal wire has a rhomboid cross section. The wire is made from a metal having a hardness higher than that of a work for which the thread insert is used.

Figure 6:
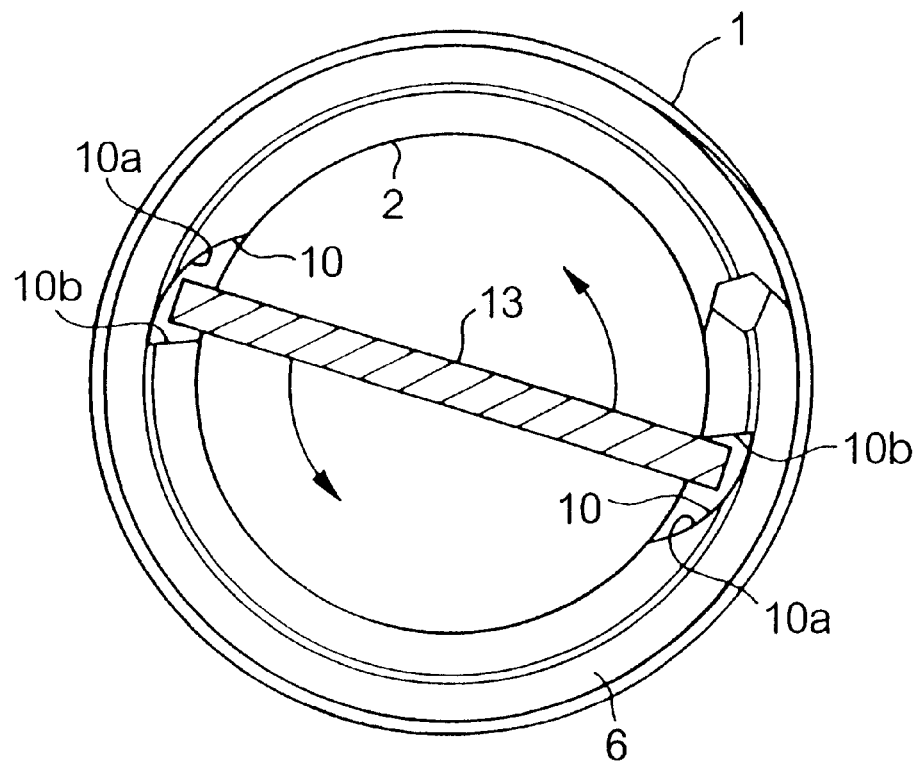
FIG. 6 is a back view of a thread insert of the first embodiment when it is unscrewed.

A pair of engaging notches 10 are formed on the inner surface of the back end portion 6 of the helical body at an interval of 180°. As shown in FIG. 1, each of the engaging notches 10 has a concave surface 10a intersecting with the inner surface of the helical body at an obtuse angle, and a tool contact surface 10b which is substantially perpendicular to the inner surface of the helical body. The tool contact surface 10b may be formed so as to intersect with the inner surface of the helical body at an acute angle. The contact surfaces 10b face toward the clockwise direction when the thread insert is seen from behind, and the contact surfaces 10b engage with both side ends of a tool 13 (for example, a minus driver), as shown in FIG. 6, when the tool 13 unscrews the thread insert.

Figure 3:
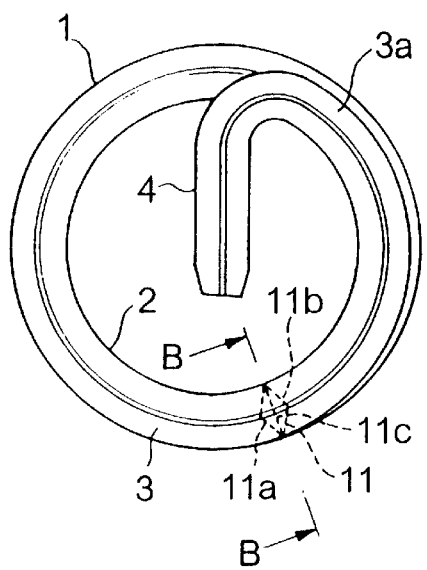
FIG. 3 is a front view of the thread insert according to the first embodiment.

As shown in FIG. 3, the detachable tongue 4 consists of a semicircular portion 3a having an outer diameter which is smaller than that of the helical body, and a straight portion 4a extending from the front end of the circular portion 3a toward the center axis of the helical body. Between the circular portion 3a and the front end portion 3 of the helical body, a cutting notch 11 for separating the detachable tongue 4 is formed on a surface facing backward. In other words, the cutting notch 11 is positioned at the modification point of the radius of curvature of the wire, and the cutting notch 11 faces backward.

Figure 4:
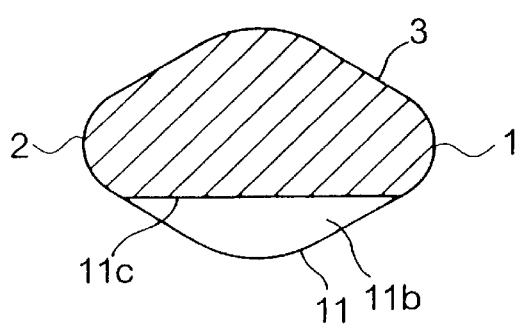
FIG. 4 is a cross section at B—B plane in FIG. 3.

As shown in FIGS. 3 and 4, the cutting notch 11 is a "V" cross-sectioned groove having first and second surfaces 11a and 11b, and a cross line 11c formed between the first and second surfaces 11a and 11b so as to extend substantially perpendicularly to the inner surface of the helical body. The cutting notch 11 and the engaging notch 10 can simultaneously be formed by press forming or die cutting a straight metal wire prior to forming the metal wire into a spiral shape. In this case, the productivity for manufacturing the thread inserts can be improved, and it is not necessary to use machining oil which may be deleterious to the atmosphere. However, the cutting notch 11 and the engaging notch 10 may be formed by machining or grinding after or before forming the metal wire into a spiral shape.

Figure 5:
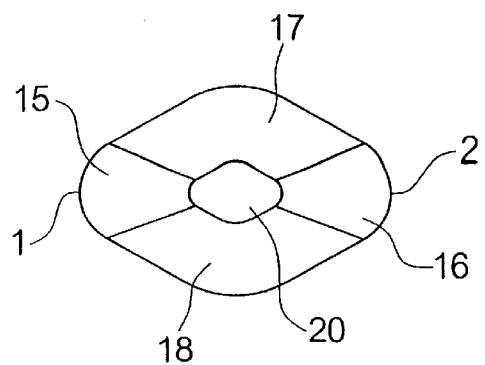
FIG. 5 is an enlarged view of the back end of a wire forming the thread insert of the first embodiment.

FIG. 5 illustrates the back end of the wire forming the insert. As shown in FIGS. 5 and 1, a center flat surface 20 and chamfered surfaces 15, 16, 17, and 18 surrounding the flat surface 20 are formed on the back end of the wire. The chamfered surfaces 15–18 prevent the back end portion 6 from scraping the inner surface of a hole of a work when the thread insert is unscrewed, thus, it is possible to decrease the rotational resistance of the insert and the risk that the inner surface of the hole will be damaged. The flat surface 20 is perpendicular to the longitudinal direction of the wire, and the flat surface 20 avoids forming a sharp tip at the center of the back end of the wire. The chamfered surfaces 15–18 and the flat surface 20 can be formed by the above-mentioned press forming or die cutting at the same time as the formation of the notches 10 and 11. However, these surfaces 15–20 may be formed by machining or grinding after or before forming the metal wire into a spiral shape. In this embodiment, although the front end of the detachable tongue 4 also has a chamfered shape similar to that of the back end of the back end portion 6, the front end of the detachable tongue 4 may have another shape.

In order to attach the thread insert in a tapped hole of a work (not shown), a tool (not shown) is inserted through the thread insert from the back end portion 6, and the detachable tongue 4 is grasped by the tool. Then, the thread insert is screwed, by rotating the tool, into the hole of the work by means of self-tapping. When the insert is screwed to a predetermined depth, the tool is pull out from the screwed insert. Next, a second tool such as a pin is inserted through the thread insert, and the detachable tongue 4 is struck by the second tool so as to break the tongue 4 at the point of the cutting notch 11.

When the detachable tongue 4 is pushed by the second tool, because the cutting notch 11 is formed so as to face toward the back end portion 6, the pushing force affects the cutting notch 11 so as to widen the notch 11, and a crack can easily generate from the cross line 11c at the bottom of the notch 11. Therefore, the detachment of the tongue 4 can be facilitated.

After the detachment of the tongue 4, the tongue 4 is removed, and a gauge inspection is performed to ascertain that the front end portion 3 is not deformed to prevent screwing of bolts. If there is no deformation of the thread insert, the attachment operation of the insert is finished.

Next, in order to remove the thread insert from the work, as shown in FIG. 6, a third tool 13 is inserted along both engaging notches 10. This third tool may be, for example, a minus driver having a tip width which is greater than the inner diameter of the thread insert and is smaller than the maximum distance between both engaging notches 10. Then, the third tool 13 is rotated counter-clockwise while engaging the tool 13 with the contact surfaces 10b of the engaging notches 10, and the thread insert is unscrewed and extracted from the hole of the work.

According to the thread insert of the present embodiment, because the engaging notches 10 are previously formed in the back end portion 6, it is possible to surely rotate the screwed insert using an ordinary tool such as a minus driver, and unscrewing the insert can thereby be facilitated. Furthermore, it is not necessary to make edges of the tool bite into the inner surface of the insert, and there is not a risk that the inner surface of the hole will be damaged by the enlargement of the insert.

Additionally, because the cutting notch 11 is formed so as to face backward, when the detachable tongue is pushed ahead, stress will concentrate at the bottom of the cutting notch 11, and a crack will generate from the bottom of the cutting notch 11. Furthermore, because the cutting notch 11 has a "V" cross section, the crack easily generates from the cross line 11c at the bottom of V-groove. Therefore, it is possible to facilitate the cutting of the detachable tongue 4.

In the present embodiment, since cutting the detachable tongue 4 can be easily performed in comparison with the case of the conventional insert, the circular portion 3a of the tongue 4 can be elongated without degrading the ease of cutting the tongue 4. Therefore, the outer diameter of the front end of the circular portion 3a can be diminished, and it is possible to improve the smoothness of the insertion of the thread insert into a hole of the work. This effect is important especially in the case where the diameter of the thread insert is large.

Furthermore, because the back end of the wire forming the thread insert is chamfered as the chamfered surfaces 15–18, when the thread insert is unscrewed by a tool, the back end of the wire does not scrape the inner surface of a tapped hole of a work. Therefore, it is possible to decrease both the rotational resistance of the thread insert and the risk that the inner surface of the hole will be damaged. Although four chamfered surfaces 15–18 are formed in this embodiment, it may also be possible to form only one chamfered surface at the outer side of the helical body.

Additionally, because the flat surface 20 is formed on the back end of the wire so as to prevent a sharp tip from generating, the risk that the back end of the wire hurts or pierces the skin or clothes of the operator can be prevented.

Furthermore, in the present embodiment, because each engaging notch 10 has a concave surface 10a intersecting with the inner surface of the helical body at an obtuse angle and a tool contact surface 10b intersecting with the inner surface of the helical body at an acute angle or at a right angle, an operator can easily notice if he rotates a tool toward the screwing direction of the thread insert. Therefore, it is possible to prevent the inner surface of the tapped hole from being damaged by the excess screwing of the thread insert. Furthermore, in the case where the tool contact surface 10b intersects at an acute angle with the inner surface of the helical body, by inserting the second tool into the back end portion 6 and rotating the tool toward the counterclockwise direction, both the side edges of the tool firmly engage with the acute edge of the engaging notch 10, and the rotational force is effectively transmitted to the thread insert.

Figure 7:
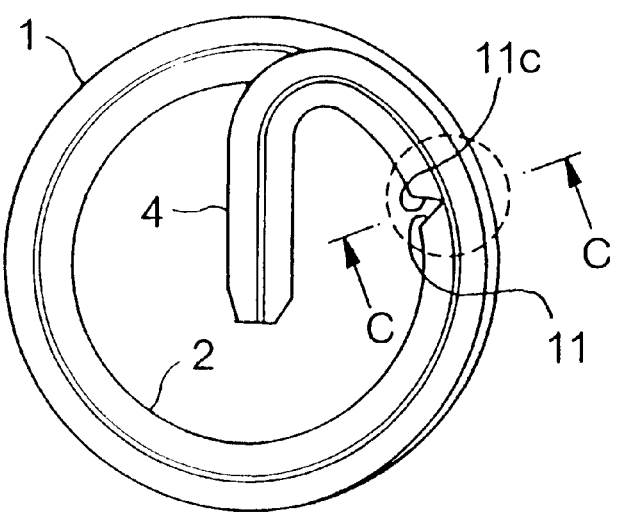
FIG. 7 and 8 are respectively a front view and side view of a thread insert according to the second embodiment of the present invention.
Figure 8:
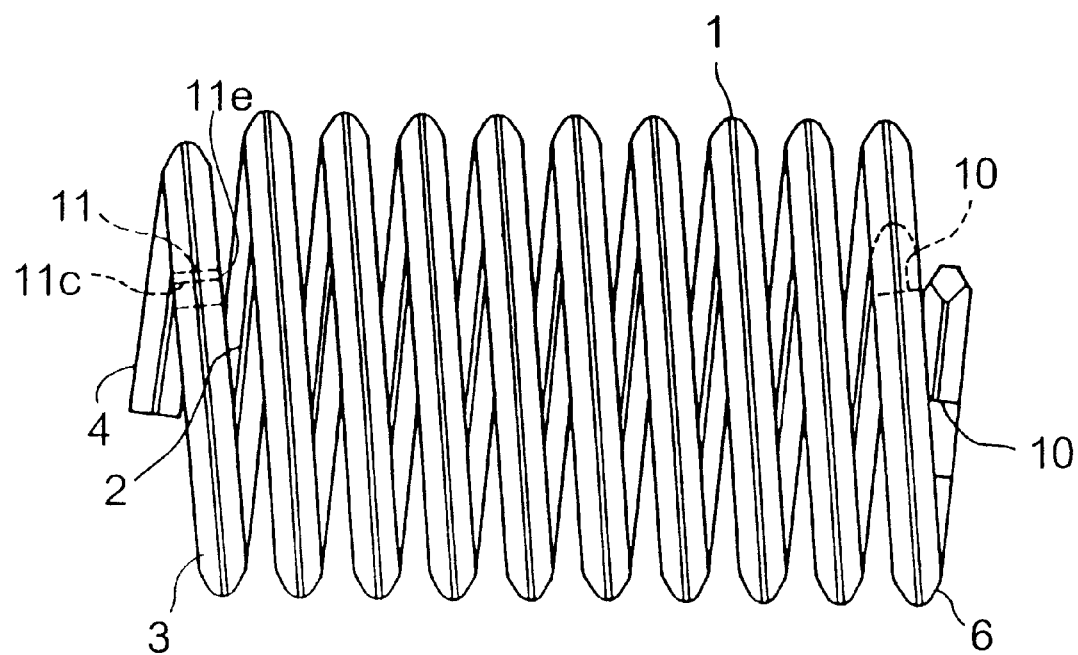
Figure 9:
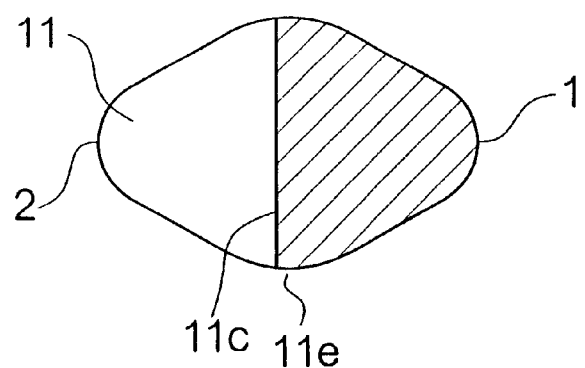
FIG. 9 is a cross section at C—C plane in FIG. 7.

FIGS. 7–9 illustrates a second embodiment of the present invention, and this second embodiment is characterized in that a cutting notch 11 is formed on the inner surface (that is, on the female thread 2) of the helical body. The cutting notch 11 has "V" cross section, and the depth thereof is about a half of the thickness of the helical body. However, the depth of the cutting notch is not limited in the present invention, and it may be modified as necessary.

In this embodiment, when the detachable tongue 4 is pushed forward by the second tool, the stress concentrates on a point 11e at which the cross line 11c intersects the rear surface of the wire, and a crack will easily generate from the point 11e. Therefore, the tongue 4 can easily be separated with reduced pushing force.

Figure 10:
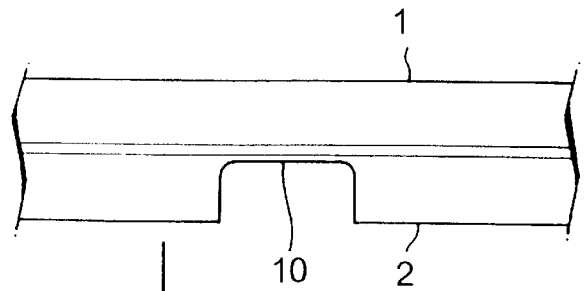
FIG. 10 is a view illustrating the method for forming engaging notches in the third embodiment of the present invention.
Figure 10:
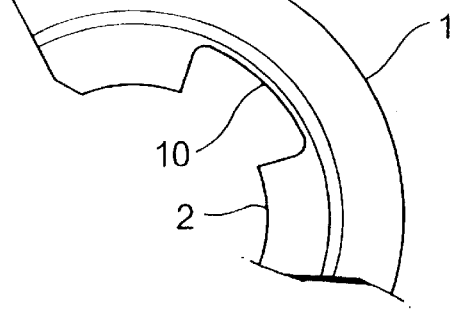
Figure 11:
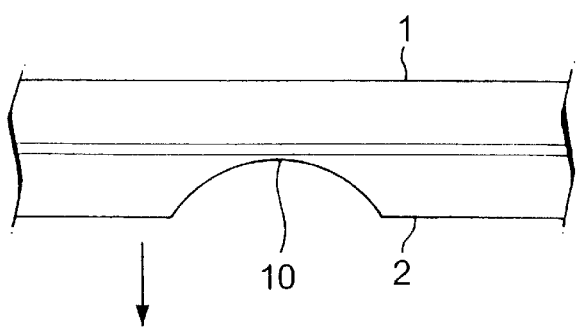
FIG. 11 is a view illustrating the method for forming engaging notches in the fourth embodiment of the present invention.
Figure 11:
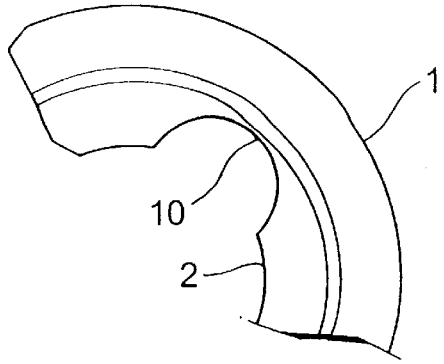
Figure 12:
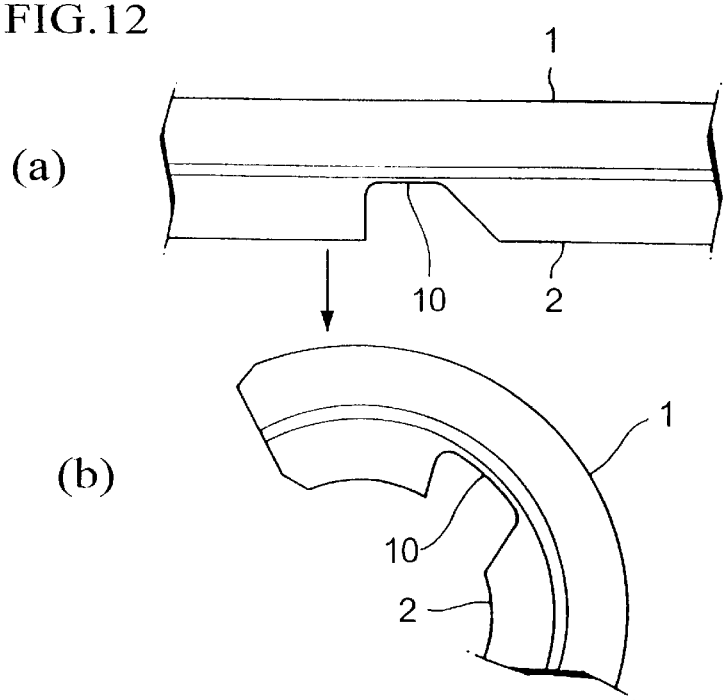
FIG. 12 is a view illustrating the method for forming engaging notches in the fifth embodiment of the present invention.

FIGS. 10–12 respectively illustrate the modifications of the engaging notches 10.

In the embodiment shown in FIG. 10, a pair of notches 10 having a square cross section are formed in a straight wire as shown in FIG. 10(a), and the wire is bent in a helical shape as shown in FIG. 10(b) so that the notches 10 comes on the inner surface of the helical body at an interval of 180°. In this case, because each engaging notch 10 has a pair of surfaces which are substantially perpendicular with the inner surface of the helical body, it is easy to rotate the thread insert, using a tool such as a minus driver, toward both the unscrewing direction and the screwing direction.

In the embodiment shown in FIG. 11, a pair of notches 10 having a arc-shaped cross section are formed in a straight wire as shown in FIG. 11(a), and the wire is bent in a helical shape as shown in FIG. 11(b) so that the notches 10 having a semicircular cross section come on the inner surface of the helical body.

Furthermore, in the embodiment shown in FIG. 12, a pair of notches 10 having a trapezoid cross section are formed in a straight wire as shown in FIG. 12(a), and the wire is bent in a helical shape as shown in FIG. 12(b) so that the notches 10 comes on the inner surface of the helical body. One side face of the engaging notch 10 intersects with the inner surface of the helical body at an acute angle, and the other side face intersects with the inner surface of the helical body at an obtuse angle. In this case, it is possible to obtain the same effects as those of the first embodiment. Furthermore, because the engaging notch 10 has a bottom face which is parallel with the longitudinal direction of the wire, the opening width of the engaging notch 10 is large, therefore, the insertion of the second tool can be facilitated.

The shape of the engaging notch is not limited to those shapes but may be modified to any shape if only the engaging notch can engage with an ordinary tool such as a minus driver. Also, the number of the engaging notches 10 may be one or three or more. For example, it is preferable to provide four engaging notches at an interval of 90°, because, in this case, one of two tool insertion positions can be selected according to the preference.

Figure 13:
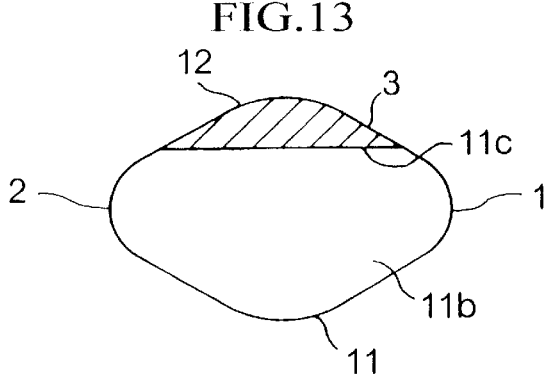
FIG. 13–17 are cross sections illustrating modifications of the cutting notch.
Figure 14:
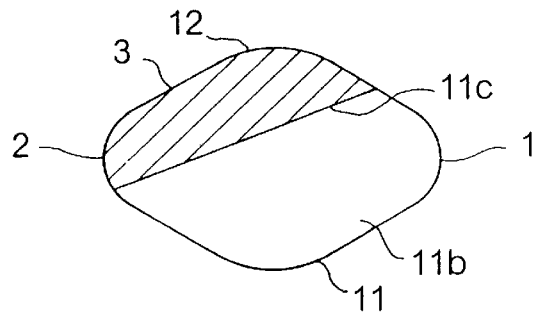
Figure 15:
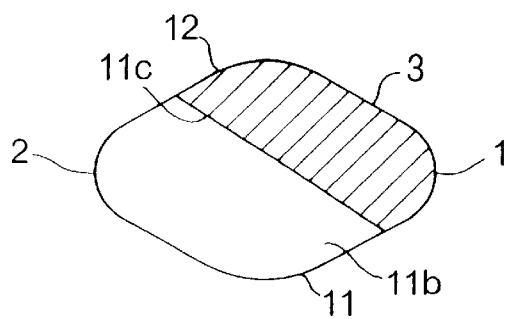
Figure 16:
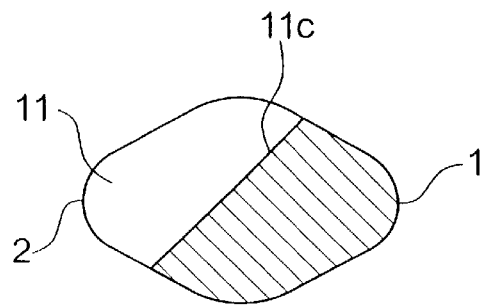
Figure 17:
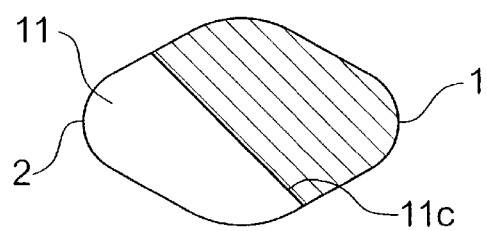

FIGS. 13–17 respectively illustrate the modifications of the cutting notch 11. As shown in FIG. 13, the cutting notch 11 may be formed deeper than that of the first embodiment. Also, as shown in FIGS. 14–17, the direction toward which the cutting notch 11 faces may be changed if necessary.

Figure 18:
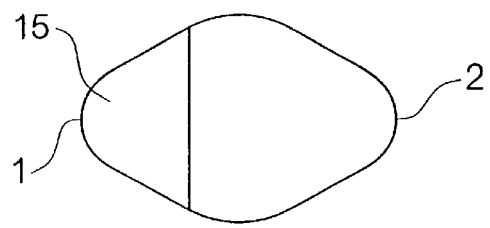
FIG. 18 and 19 are back views illustrating modifications of the chamfering of the wire end.
Figure 19:
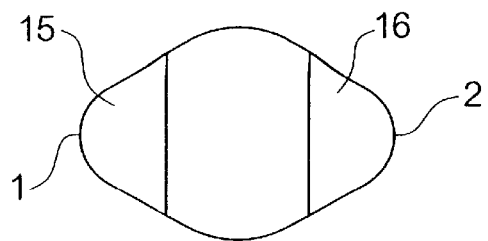
Figure 20:
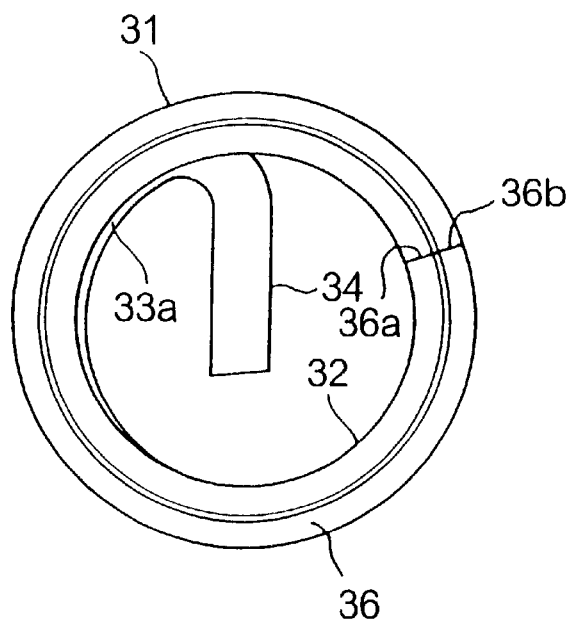
FIG. 20 is a back view of an example of conventional thread insert.
Figure 21:
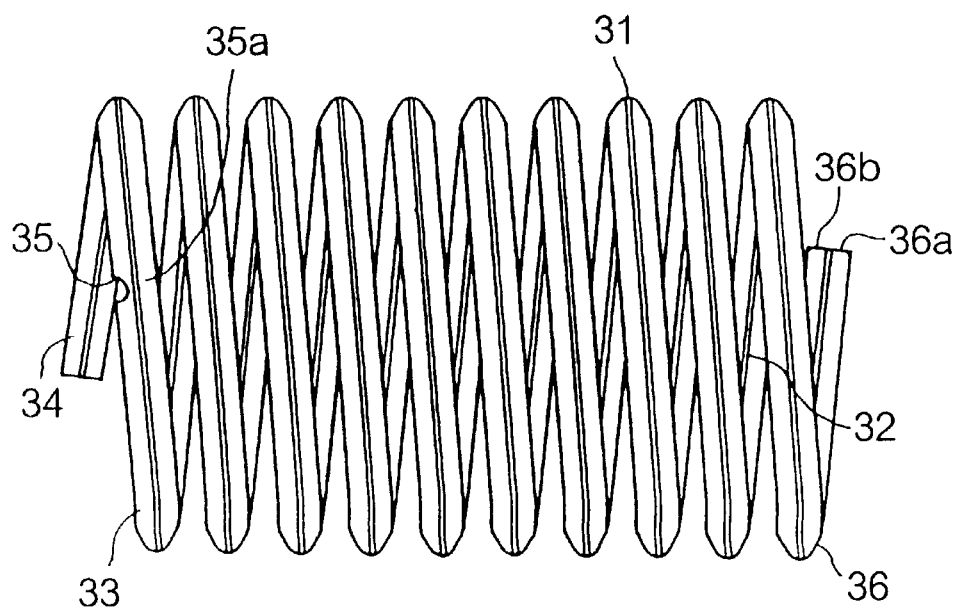
FIG. 21 is a front view of the conventional thread insert.
Figure 22:
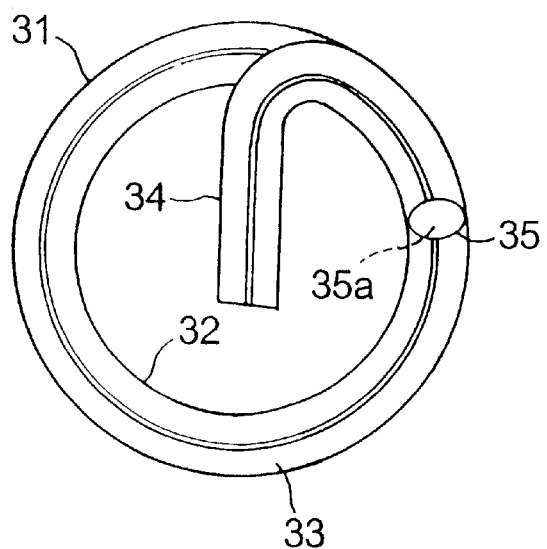
FIG. 22 is a side view of the conventional thread insert.
Figure 23:
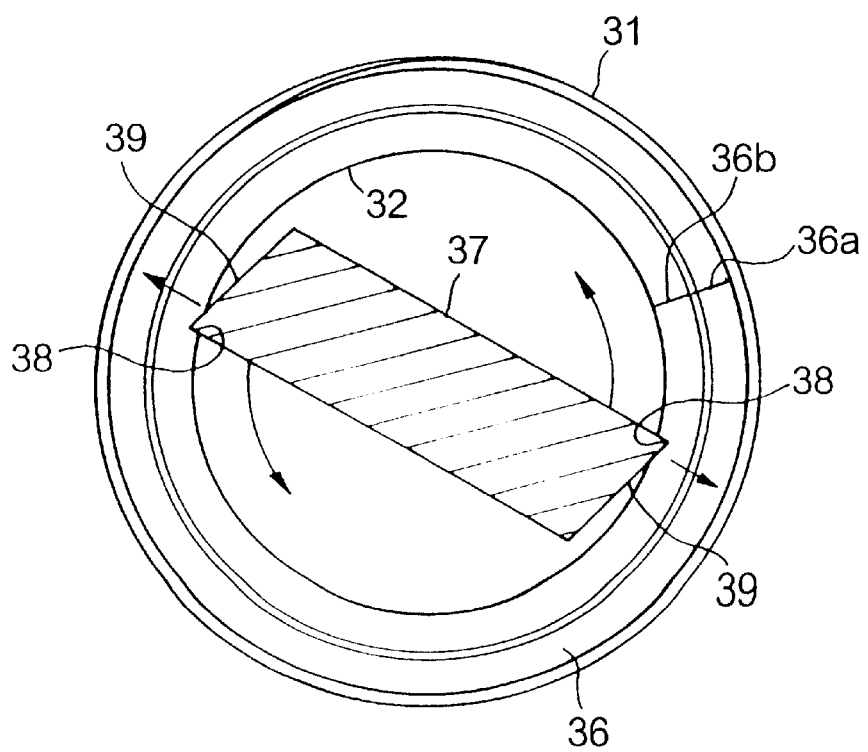
FIG. 23 is a back view of the conventional thread insert when it is unscrewed.

Furthermore, the chamfering of the back end of the wire may be modified as long as the scraping of the inner face of the work hole can be prevented. For example, only the outer edge of the end face may be chamfered as shown in FIG. 18, or both the outer and inner edges of the end face may be chamfered as shown in FIG. 19.

Although several embodiments of the present invention are explained, the present invention is not limited to these embodiment, but it is also possible to combine selected features of each embodiment with each other.

What is claimed is:

1. A thread insert comprising a helical body having a front end portion and a back end portion, and a detachable tongue connected to the front end portion of the helical body, wherein the back end portion has a pair of engaging notches formed at the opposite sides on the inner surface of the back end portion.

2. The thread insert according to claim 1, wherein the engaging notches are formed at an interval of 180° on the inner surface of the back end portion.

3. The thread insert according to claim 1, wherein each of the engaging notches has a tool contact surface which is substantially perpendicular to the inner surface of the helical body and faces toward the clockwise direction when viewed from the rear.

4. The thread insert according to claim 1, wherein each of the engaging notches has a tool contact surface which intersects with the inner surface of the helical body at an acute angle and faces toward the clockwise direction when viewed from the rear.

5. The thread insert according to claim 1, wherein the back end portion has a back end face chamfered at an outer side of the helical body.

6. The thread inset according to claim 5, wherein the back end surface of the back end portion additionally has a flat face perpendicular to an outer surface of the helical body.

7. A thread insert comprising a helical body having a front end portion and a back end portion, and a detachable tongue connected to the front end portion of the helical body, wherein at least one engaging notch is formed in the back end portion of the helical body, and at least one cutting notch is formed between the front end portion and the detachable tongue on at least one of a surface facing toward the back end portion and a surface facing toward a center axis of the helical body.

8. The thread insert according to claim 7, wherein the cutting notch has a "V" shaped cross section.

9. A thread insert comprising a helical body having a front end portion and a back end portion, and a detachable tongue connected to the front end portion of the helical body, wherein at least one engaging notch is formed in the back end portion of the helical body, a female thread is formed on an inner surface of the helical body, a male thread is formed on an outer surface of the helical body, and the detachable tongue has a circular portion having an outer diameter which is smaller than that of the helical body.

10. A thread insert comprising a helical body having a front end portion and a back end portion, and a detachable tongue connected to the front end portion of the helical body, wherein at least one engaging notch is formed in the back end portion of the helical body, the detachable tongue has a circular portion having an outer diameter which is smaller than that of the helical body, and a cutting notch is formed between the front end portion of the helical body and the circular portion of the detachable tongue.

\* \* \* \* \*

UNITED STATES PATENT AND TRADEMARK OFFICE
CERTIFICATE OF CORRECTION

PATENT NO.      : 6,171,040 B1
DATED           : January 9, 2001
INVENTOR(S)     : T. Sato It is certified that error appears in the above-identified patent and that said Letters Patent is hereby corrected as shown below:

<u>Title page,</u>
Item [56], References Cited, U.S. PATENT DOCUMENTS,
insert -- 2,390,514    12/1945    Cram
         2,607,259    08/1952    Forster
         3,444,915    05/1969    Gerhardt, et al.
         4,563,119    01/1986    Cosenza
         4,645,398    02/1987    Cosenza, et al.

FOREIGN PATENT DOCUMENTS, insert -- 0228981A1  9/1986  (EP)
                                    7-38731    10/1995  (JP) --

Signed and Sealed this

Twenty-third Day of July, 2002

*Attest:*

*Attesting Officer*

JAMES E. ROGAN
*Director of the United States Patent and Trademark Office*